United States Patent [19]

Schultz et al.

[11] 4,085,314
[45] Apr. 18, 1978

[54] ENCODABLE RETROREFLECTIVE SHEETING

[75] Inventors: Thomas E. Schultz, Roseville; Peter W. Schuchardt, May Township, Washington County, both of Minn.

[73] Assignee: Minnesota Mining and Manufacturing Company, St. Paul, Minn.

[21] Appl. No.: 656,600

[22] Filed: Feb. 9, 1976

[51] Int. Cl.² .............................................. G06K 19/06
[52] U.S. Cl. ..................................... 235/487; 235/488
[58] Field of Search ............... 235/61.12 N, 61.12 M, 235/61.12 R; 40/135; 340/146.3 Z, 146.3 K; 35/48 A, 48 B

[56] References Cited

U.S. PATENT DOCUMENTS

| 2,407,680 | 9/1946 | Palmquist et al. | 350/105 |
| 2,511,953 | 6/1950 | Tallman | 35/24 |
| 3,190,178 | 6/1965 | McKenzie | 350/105 |
| 3,705,294 | 12/1972 | Kuehnle et al. | 235/61.12 N |
| 3,743,819 | 7/1973 | Kapsambelis et al. | 235/61.12 N |

Primary Examiner—Daryl W. Cook
Attorney, Agent, or Firm—Cruzan Alexander; Donald M. Sell; Roger R. Tamte

[57] ABSTRACT

Sheet material useful to form a coded retroreflective mark comprises a retroreflective base sheet and a cover film adhered over the base sheet and precut to form a plurality of removable sections. The cut sections are arranged in a predetermined pattern such that removal of different sections to expose the retroreflective sheeting under the sections provides different codes that may be read and distinguished by photoscanning equipment.

1 Claim, 5 Drawing Figures

ENCODABLE RETROREFLECTIVE SHEETING

BACKGROUND OF THE INVENTION

Coded retroreflective marks offer a number of advantages for marking articles to be handled by automated equipment. For example, in comparison to coded marks formed from a series of black and white stripes such as used to mark grocery items, retroreflective code marks may be more rapidly and reliably read; they may be read at greater distances; and they permit wider latitude in unfavorable conditions—misalignment of an article or dirtying or obscuring of a mark—without preventing sensing of the mark. Further, retroreflective code marks may conveniently be reused.

However, maximum exploitation of retroreflective code marks has been prevented by lack of convenient, accurate, and inexpensive techniques for forming coded marks. The deficiencies of existing techniques can be illustrated by one previously used system, which uses code plates formed by adhering a sheet of retroreflective material to a support member and then covering the retroreflective sheet with a metal face plate in which a desired pattern of openings has been stamped. Deficiencies of this system include the high cost of preparing each code plate; the inconvenience of maintaining an inventory of different cover plates each stamped with a different pattern of openings; and the opportunity for error, since stamping of the cover plates is usually performed at a location removed from the point of application of a mark to an article.

SUMMARY OF THE INVENTION

The present invention provides a new sheet material that may be supplied in a standard form, i.e. the same for each object in a set of objects to be marked, and then rapidly encoded at a job site to provide a different mark for each one of the objects. Briefly, this new sheet material comprises a retroreflective base sheet and a cover film removably adhered over the base sheet and precut into a plurality of sections. The cut sections are individually removable to expose portions of retroreflective sheeting under the sections, and the sections are arranged in a predetermined pattern such that removal of different sections provides different codes that may be read and distinguished by photoscanning equipment.

Sheet material of the invention may be used in the form described, e.g. by adhering it to an article to be marked; or it may be adhered to a support member to form a code plate that is then mounted on the article. Further, the sheet material may be supplied in discrete sheets or in elongated tape form generally wound in a storage roll.

Removal of cut sections of cover film is very rapid and convenient. Further, since the sections are machine-cut, their location is precise. No effort is needed to position a retroreflective tape, since formation of a mark requires only the removal of precut sections of cover film.

DETAILED DESCRIPTION

Figure 1:
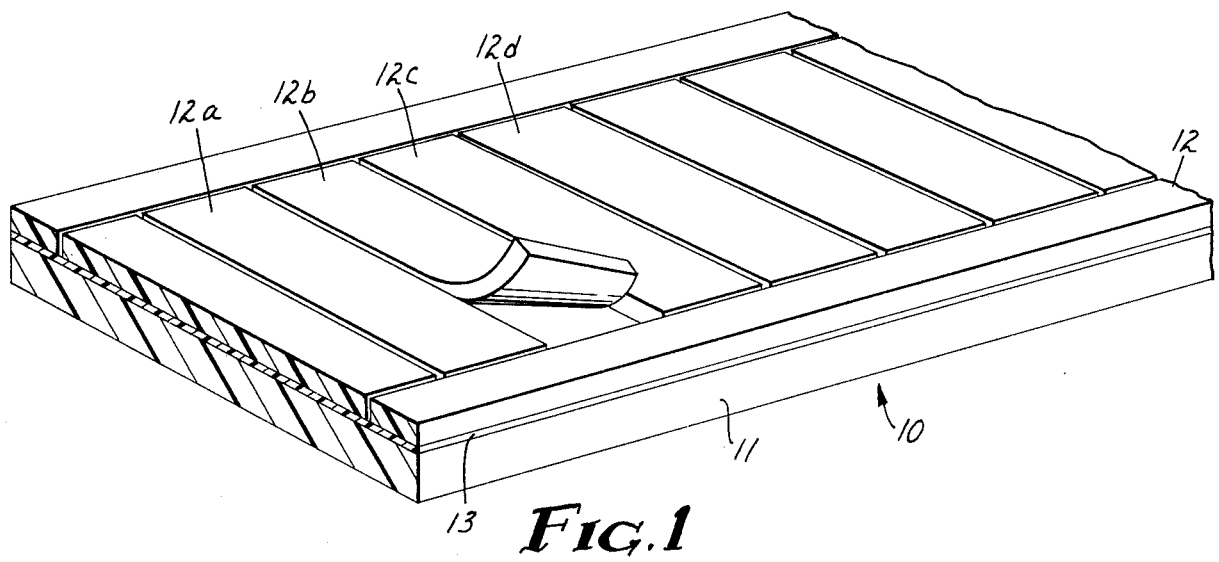
FIG. 1 is a perspective view of an illustrative sheet material of the invention with the thickness of the tape shown greatly enlarged over true scale.

FIG. 1 shows a portion of an illustrative sheet material of the invention 10 in tape form. This sheet material comprises a base retroreflective sheet 11 and a cover film 12 adhered to the base sheet by a layer of adhesive 13. The cover film is precut to form a series of removable sections 12a, b, c . . . . To form a code, one or more of the sections is peeled away in the manner illustrated for the section 12b.

Figure 2:
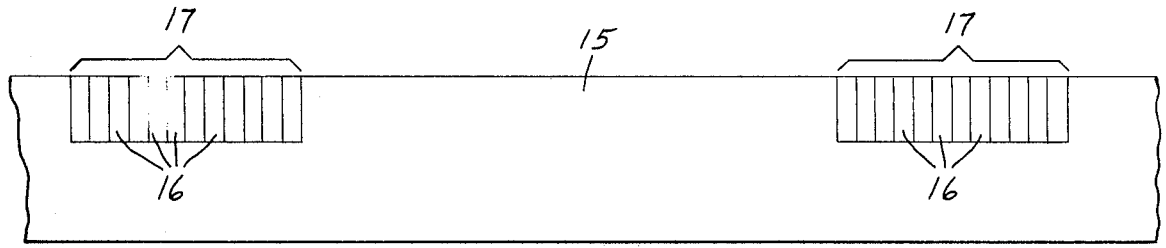
FIG. 2 is a top view of a portion of a different illustrative sheet material of the invention.
Figure 3:
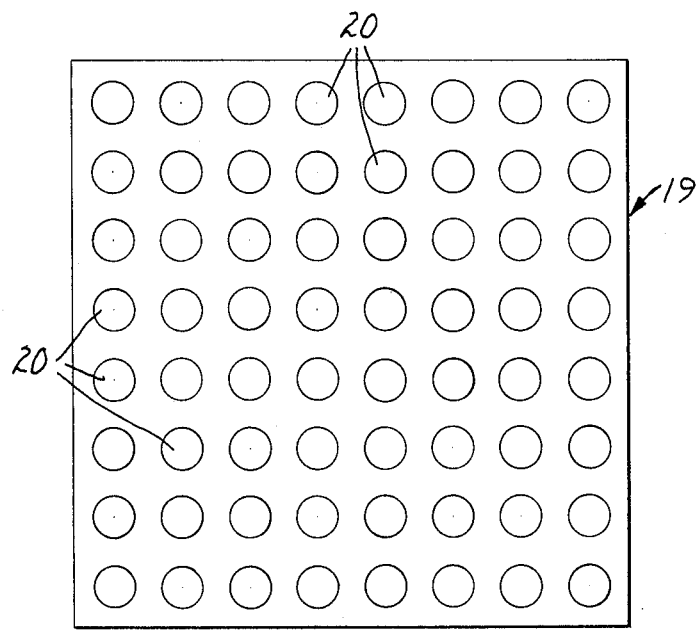
FIG. 3 is a top view of another illustrative sheet material of the invention.

The cover film may be cut into a wide variety of patterns to tailer a sheet material of the invention for a particular use. Two additional useful patterns are shown in FIGS. 2 and 3. In the tape 15 shown in FIG. 2, the removable sections 16 of cover film are in groups 17 spaced along the length of the tape. One use for such a tape is to mount it on a support structure with the groups of removable sections located at parts of the structure, e.g. storage containers, that need to be separately identified. In the sheet material of the invention 19 shown in FIG. 3, which takes the form of a square sheet, the removable sections 20 are separated from one another and form a code matrix. The removable sections may be in a variety of geometric forms other than the circles shown in FIG. 3, e.g. triangles, squares, etc.

Figure 5:
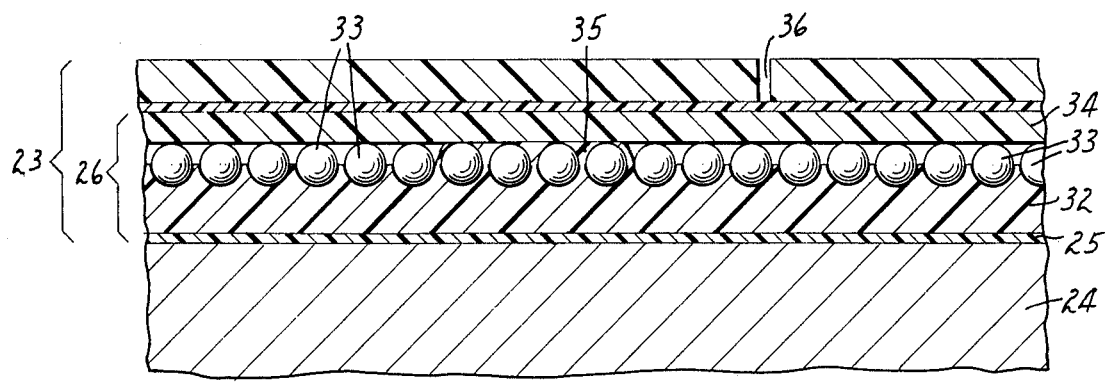
FIG. 5 is a greatly enlarged section through a portion of the code plate of FIG. 4 taken along the lines 5—5 of FIG. 4.
Figure 4:
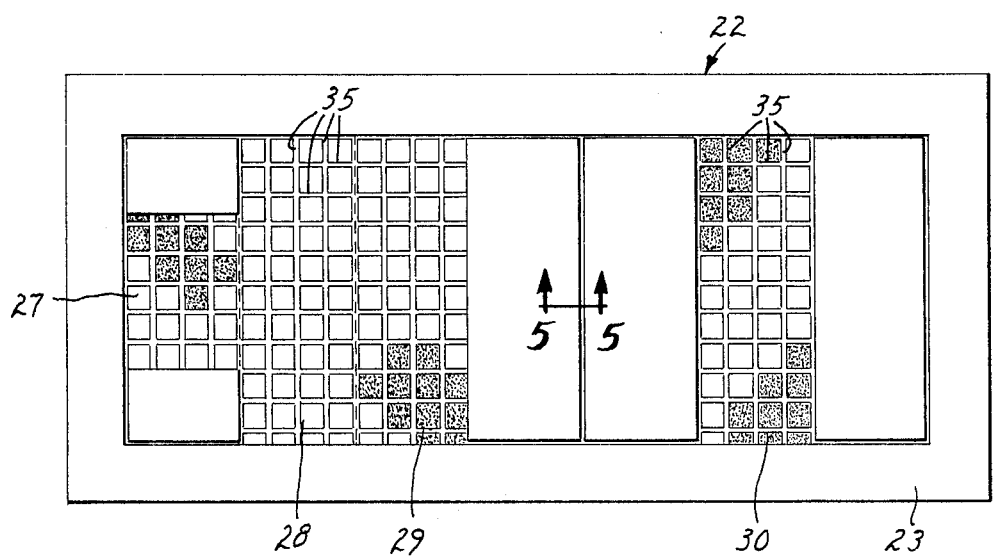
FIG. 4 is a top view of an illustrative code plate of the invention.

FIGS. 4 and 5 show a code plate 22 made by adhering sheet material of the invention 23 to a support member 24 such as a metal or plastic plate by a layer of adhesive 25; the support member may be either rigid or flexible. Means for attaching the code plate to an article may be carried on the back surface of the support plate, such as a layer of pressure-sensitive adhesive, a foam-backed adhesive tape, or a polymer-based magnet such as taught in Blume, U.S. Pat. No. 2,999,275.

The code plate 22 illustrated in FIG. 4 has four sections of cover film removed to expose retroreflective sheeting 26 in the areas 27, 28, 29, and 30. The section 27 may serve as an alignment section: photoscanners intended to read the code plate can be programmed to operate only if the section 27 is sensed by the photoscanner; since section 27 is smaller in size it will generally be sensed only if the whole code plate is in proper alignment.

The retroreflective sheeting 26 used in the illustrative code plate 22 is of a cellular type described in McKenzie, U.S. Pat. No. 3,190,178. As shown in FIG. 5 such a sheeting may include a bottom sheet 32 in which a layer of glass microspheres 33 is partially embedded, and a transparent top film 34 supported above the layer of microspheres by a network of adhesive bonds 35. The latter may be formed by pressing binder material from the botton sheet into contact with the cover film so as to flood the microspheres in the bond area and separate the space between the bottom sheet and cover film into a plurality of cells. The described cellular sheeting not only exhibits high reflectivity, but it may be conveniently cut into sections without disturbing the hermetic seal above substantially all of the micropheres in the sheeting.

Another useful flat-surfaced retroreflective sheeting is taught in Palmquist et al, U.S. Pat. No. 2,407,680. In general, retroreflective sheeting having a flat front surface is preferred for the best adhesion and for lasting cleanliness of exposed code portions.

The cover film is typically a flexible opaque polymeric film (by "opaque" it is meant that the film prevents transmission of light rays that would actuate photoscanning sensors as they are commonly used in automated material handling). Most often the cover film is pigmented black, though it may also be pigmented some other color since the contrast retroreflective sheeting and even colored film is sufficient to allow a photoscanner to distinguish between them. A pressure-sensitive adhesive is typically used to adhere the cover film to the base retroreflective sheet. Non-setting pressure-sensitive adhesives are available which retain a rather constant adhesive nature for extended periods of time. The result is that a section may be removed immediately upon manufacture of material of the invention or at some later time when it is desired to form a code or change a code.

In manufacturing sheet materials of the invention, a layer of pressure-sensitive adhesive is typically coated onto the cover film, and the cover film then laminated by means of the adhesive to a base retroreflective sheeting. Thereupon the cover film is precut by a technique that typically does not result in cutting of the base retroreflective film. Rotary dies or steel rule dies that cut to a controlled depth provide one useful technique. Preferably the cutting die is heated when a polymeric cover film such as a vinyl cover film is used, because the heat will cause the cover film to shrink slightly after cutting. The cut sections of cover film thus have a slight space between them (see the space 36 in FIG. 5), so that removal of the sections is made more convenient.

As the drawings illustrate, the cut sections are generally in a predetermined pattern such that removal of one or more different sections provides different codes that may be read and distinguished by photoscanning equipment. The cut sections typically include sections of identical shape, and the sections are often contiguous to one another, as shown in FIGS. 1, 2, and 4. The sections are also preferably in alignment along a longitudinal axis as is true for each of the embodiments shown in the drawings (the FIG. 3 embodiment also includes sections that are in alignment along a transverse axis).

In a specific example of the code plate shown in FIGS. 4 and 5, there are eleven cut sections, with the eight middle sections being used to form a binary code. These eight sections were each about ½ inch by 1½ inches in size, which provides very adequate sensing. Larger or smaller sizes can also be used.

What is claimed is:

1. Elongate sheet material wound onto a storage roll and useful to form a coded retroreflective mark, said sheet material comprising a retroreflective base sheet having a planar front face and an opaque flexible polymeric cover film removable adhered over said planar front face by a layer of pressure-sensitive adhesive, said film being cut along a plurality of lines in a pattern that forms a plurality of contiguous parallel sections that are aligned along the longitudinal axis of the sheet material, comprise sections having an identical size and shape, and are individually removable to expose the portion of the retroreflective base sheet underneath the section, the sections being arranged in a predetermined pattern such that removal of one or more different sections provides different codes that may be read and distinguished by photoscanning equipment.

* * * * *